US005084100A

United States Patent [19]
Bauman

[11] Patent Number: 5,084,100
[45] Date of Patent: Jan. 28, 1992

[54] QUINACRIDONE DISPERSION MILLING PROCESS

[75] Inventor: Donald L. Bauman, Wilmington, Del.

[73] Assignee: Ciba-Geigy Corporation, Ardsley, N.Y.

[21] Appl. No.: 630,704

[22] Filed: Dec. 20, 1990

[51] Int. Cl.$^5$ .................. C09B 67/52; C09B 48/00
[52] U.S. Cl. .................. 106/495; 106/493; 106/494; 106/497
[58] Field of Search .................. 106/497, 495, 493

[56] References Cited

U.S. PATENT DOCUMENTS

| | | | |
|---|---|---|---|
| H564 | 1/1989 | Allen, III et al. | 106/497 |
| 4,247,695 | 1/1981 | Fitzgerald | 106/497 |

Primary Examiner—William R. Dixon, Jr.
Assistant Examiner—Margaret Einsmann
Attorney, Agent, or Firm—Harry Falber

[57] ABSTRACT

A dispersion milling process for reducing the particle size of quinacridone pigments wherein the quinacridone is milled in the presence of hydrated aluminum sulfate and, as a crystallizing solvent, a lower alkyl ester of a $C_2$–$C_{10}$ dibasic carboxylic acid.

6 Claims, No Drawings

QUINACRIDONE DISPERSION MILLING PROCESS

The quinacridone series of compounds and their pigmentary properties are well known, having been described in numerous patents and in the technical literature. This series includes various unsubstituted quniacridones and di-substituted quinacridones such as di-halo and di-alkyl derivatives. Dimethyl derivatives are disclosed, for example, in U.S. Pat. No. 3,264,298, difluoro derivatives in U.S. Pat. No. 3,793,327, and dichloro derivatives in U.S. Pat. No. 4,015,998.

It is well known in the art that quinacridones as synthesized, known as crude quinacridones, are generally unsuitable for use as pigments and must be further processed to develop the requisite pigmentary properties such as particle size, particle shape, polymorphic phase, tinctorial strength, etc. The most commonly used processes for converting crude quinacridones to pigmentary form involve milling the crude quinacridone with large quantities of inorganic salt and then extracting the resulting mill powder.

A commercial dispersion milling process for quinacridone pigments wherein the particle size thereof is reduced is disclosed in U.S. Pat. No. 3,030,370. The process involves milling in the presence of hydrated aluminum sulfate and in the presence of a crystallizing solvent. The crystallizing solvents are broadly defined as anhydrous organic solvents with boiling ranges high enough to withstand the heat of grinding without volatilization and low enough to permit removal by steam distillation. Suitable solvents include tetrachloroethylene as the preferred solvent and other hydrocarbons and chlorinated hydrocarbons.

The procedure described in the patent makes it possible either to retain the crystal phase of the starting material or to bring about a desired conversion to a new crystal phase. In all cases, products of unexpected strength and intensity are obtained. Grinding in the absence of solvents tends to convert the products to the least stable phases (called the alpha phase). The introduction of a solvent alters the equilibrium but the degree of alteration is influenced by the nature and amount of solvent, the nature of the pigment, and the amount of grinding. The solvent tends to promote the formation of the more stable phases or, as a corollary, to retain the more stable phase if it is the starting material.

As noted above, tetrachloroethylene (perclene) was identified as the preferred solvent and has, in fact, been the solvent of choice in commercial processes. However, perclene has now become unacceptable due to environmental and toxicological concerns. Such concerns stem from high vapor pressure and poor water solubility which foster emission problems, from the inability to completely remove the perclene solvent from the milling operation and from its toxicity. Accordingly, it has now become necessary to identify replacement solvents which, at a minimum, are environmentally acceptable without substantially reducing the performance effectiveness of the perclene solvent.

It has now been surprisingly discovered that lower alkyl esters of $C_2$-$C_{10}$ dibasic carboxylic acids can be readily utilized as crystallizing solvents in such dispersion milling processes. Thus, such solvents exhibit a much lower order of toxicity and possess the physical characteristics which allow for their use in an environmentally sound manner. These solvents are as effective as perclene in controlling particle size and maintaining quinacridone crystal phase during dispersion milling. Of particular significance is the fact that such solvent systems improve upon the use of perclene in terms of providing equivalent performance with reduced amounts of solvent. The various benefits can be summarized as follows:

1. The low volatility of these esters greatly reduces the loss of organic vapors to the atmosphere when the mill powder is removed from the mill.
2. In general, a smaller amount of dibasic ester is needed to obtain similar results.
3. The introduction of less solvent into the mill allows the internal mill temperature to be controlled much more closely.
4. Both the solvent and its hydrolysis products are water soluble. This allows for their substantially complete removal from the pigment.
5. The organic vapors (solvent and hydrolysis product) which evolve during the extraction step are readily removed from the air stream.
6. These materials have a very low order of toxicity.

The applicable solvents correspond to the formula

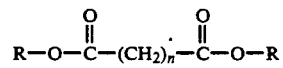

wherein R is $C_1$-$C_8$alkyl and n is 0–8.

Preferred alkyl groups (R) are $C_1$-$C_4$alkyl and most preferably methyl. Typical acid esters are malonates, succinates, glutarates and adipates, with succinates and glutarates being particularly preferred. Dimethyl glutarate is the preferred solvent.

The specific benefits of dimethyl glutarate include:

a. Dimethyl glutarate (vapor pressure 2 mm$^{Hg}$ at 60° C.) greatly reduces the emission of organic vapors.
b. Smaller amounts of dimethyl glutarate are needed relative to perclene to generate product with similar pigmentary characteristics. This allows the internal temperature of the mill to be controlled much more easily.
c. During dilute acid extraction of the mill powder, dimethyl glutarate hydrolyzes to methanol and glutaric acid. Since these are both highly water soluble, they are easily removed from the pigment during the filtration process. Any methanol which is vaporized is easily scrubbed or thermally oxidized.
d. Dimethyl glutarate has a low order of toxicity.

All quinacridone pigments are applicable for use in the instant process. Such quinacridones may be unsubstituted or substituted and in any crystalline phase. Typical quinacridones include linear quinacridones of the formula

quinacridonequinones of the formula

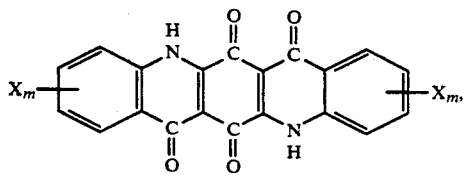

and isoquinacridones of the formula

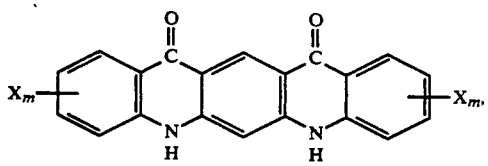

wherein X is independently halogen, lower alkyl or lower alkoxy, and m is 0-2. Lower alkyl and alkoxy is preferably $C_1$-$C_4$. The process is also applicable to mixtures of said quinacridones and solid solutions thereof.

The process of the invention proceeds by milling quinacridone pigments with hydrated aluminum sulfate, said milling being conducted in the presence of said crystallizing solvent in such an amount that the mass appears dry and free flowing throughout the operation. The mill powder is subsequently extracted in an aqueous medium and the pigment recovered. The introduction of a small amount (approximately 5-10%, by weight of pigment) of a surfactant during the milling step gives further improvements with respect to the quality of the resulting products and often reduces the required milling cycle.

Suitable mills such as ball mills and suitable grinding media, e.g. steel shot, iron nails and spikes, ceramic beads, are well known to those skilled in the art. Milling cycles generally range from 2 to 10 hours. The amount of solvent is chosen such that the desired crystal phase is maintained, while allowing the desired particle size to be generated in a reasonable mill time. Amounts ranging from 2 to 15%, by weight of quinacridone, and preferably 4 to 13%, are generally utilized.

The resulting pigments are equivalent in pigmentary color, quality and performance to the current commercial counterparts prepared with perclene. They can be surface treated and utilized in the same broad range of substrates including automotive finishes, lacquers, enamels, both solvent and water based, as well as plastics and inks.

The following examples further illustrate the embodiments of this invention. In these examples, all parts and percentages given are by weight unless otherwise indicated.

EXAMPLE 1

A commercial scale ball mill with an internal diameter of about 1.83 m and a length of about 1.83 m and containing 10,000 kg of "Cyl-Pebs" (approximately 2.5 cm sections of 1.6 cm diameter steel rod) and 1182 kg of railroad spikes is charged with 409 kg of commercial aluminum sulfate (17% minimum effective $Al_2O_3$ content), 6.4 kg of dimethyl glutarate, 6.4 kg of isopropylammoniumdodecylbenzene sulfonate surfactant (Emcol P-1059), and 104.5 kg of crude beta phase quinacridone. The charge is ground by rotating the mill for 5½ hours. The contents of the mill are then discharged through a screen which retains the "Cyl-Pebs" and railroad spikes.

A suitable agitated vessel is charged with 13,636 kg of 2% sulfuric acid and 5955 kg of mill powder from above. The mixture is heated near its boiling point for 2 hours after which the pigmentary beta phase quinacridone is isolated in a suitable filtration device and washed free of acid. The resulting water wet pigment may be either dried as such or further treated depending on the desired end use.

Pigment generated in this manner is commercially equivalent in pigmentary form and properties to material which is generated in the identical manner using 15.5 kg of tetrachloroethylene in the ball mill instead of dimethyl glutarate. Equivalent results are also achieved in the commercial scale mill using dimethyl succinate instead of dimethyl glutarate.

EXAMPLE 2

A commercial scale ball mill as described in Example 1 is charged with 409 kg of commercial aluminum sulfate, 5.5 kg of dimethyl glutarate, 5.5 kg of isopropylammoniumdodecylbenzene sulfonate and 104.5 kg of crude gamma phase quinacridone. The charge is ground by rotating the mill for 2½ hours after which the mill is discharged through a screen which retains the "Cyl-Pebs" and railroad spikes.

A suitable vessel is charged with 13,636 kg of 2% sulfuric acid and 5955 kg of mill powder from above. The mixture is heated near its boiling point for two hours after which the pigmentary gamma phase quinacridone is isolated in a suitable filtration device and washed free of acid and salts. The resulting water wet pigment may be either dried as such or further treated depending on the desired end use.

Pigment generated in this manner is commercially equivalent to material which is identically generated using 14.5 kg of tetrachloroethylene instead of dimethyl glutarate and grinding for 3¼ hours instead of 2½ hours.

EXAMPLE 3

A commercial scale ball mill as described in Example 1 is charged with 409 kg of commercial aluminum sulfate, 10.5 kg of dimethyl glutarate, 75.5 kg of gamma phase quinacridone crude and 29.1 kg of 2,9-dimethylquinacridone crude. The charge is ground by rotating the mill for 8 hours after which the mill is discharged through a screen which retains the "Cyl-Pebs" and railroad spikes.

A suitable vessel is charged with 8182 kg of 1.5% sulfuric acid, 68.2 kg of isopropylammoniumdodecylbenzene sulfonate and 4909 kg of mill powder from above. The mixture is heated near its boiling point for 3 hours after which the pigmentary solid solution of 2,9-dimethylquinacridone and quinacridone is isolated in a suitable filtration device and washed free of acid and salts. The resulting water wet pigment may be either dried as such or further treated depending on the desired end use.

Pigment generated in this manner is commercially equivalent in pigmentary qualities to material which is generated using 13.6 kg of tetrachloroethylene instead of the dimethylglutarate and grinding for 10½ hours instead of 8 hours.

EXAMPLE 4

A ball mill with an internal diameter of about 61 cm and a total capacity of about 227 liters and containing 454.5 kg of "Cyl-Pebs" and 45.5 kg of 20 penny nails is charged with 19.8 kg of commercial grade aluminum sulfate, 5 kg of gamma phase quinacridone crude and solvent and surfactant as described in the following table.

| Solvent | Solvent (kg) | Surfactant* (kg) | Grind time (hrs.) |
|---|---|---|---|
| tetrachloroethylene | 0.7 | 0.25 | 7½ |
| dimethyl succinate | 0.17 | 0.17 | 5.5 |
| diisopropyl succinate | 0.25 | 0.25 | 5.5 |
| dibutyl sebacate | 0.25 | 0.25 | 5.5 |

*Surfactant = isopropylammoniumdodecylbenzene sulfonate

The charge is ground by rotating the mill at 40 rpm for the time specified in the table after which the contents of the mill are discharged through a screen which retains the "Cyl-Pebs" and nails.

A 1 liter 4-neck flask under agitation is charged with 210 grams of 3% sulfuric acid and 50 grams of mill powder from above. The mixture is heated to 90°–95° C. for 2 hours after which it is cooled to 70° C., filtered and washed salt free. The resulting pigmentary gamma phase quinacridone is dried and pulverized. Evaluation of the above by well known varnish dryer rubout techniques (Hoover Muller in lithographic varnish) shows all four of the pigment preparations to be equal in color properties.

What is claimed is:

1. In the process of dispersion milling a quinacridone pigment by milling said pigment in the presence of hydrated aluminum sulfate and a crystallizing solvent, removing the aluminum sulfate and solvent from the pigment and recovering a pigment of reduced particle size, the improvement comprising using as said crystallizing solvent, a dicarboxylic acid ester of the formula

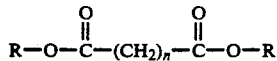

wherein R is $C_1$–$C_8$ alkyl and n is 0–8.

2. The process of claim 1, wherein R is $C_1$–$C_4$ alkyl and n is 1–4.

3. The process of claim 2, wherein each R is methyl and n is 2 or 3.

4. The process of claim 3, wherein said solvent is dimethyl glutarate.

5. The process of claim 1, wherein said solvent is utilized in a concentration of from 2 to 15%, by weight of pigment.

6. The process of claim 1, wherein said quinacridone is a substituted or unsubstituted linear quinacridone, quinacridonequinone, isoquinacridone, mixtures thereof or solid solutions thereof.

* * * * *